No. 69,473. PATENTED OCT. 1, 1867.
C. C. PARSONS.
PIPE AND BOLT CUTTER.
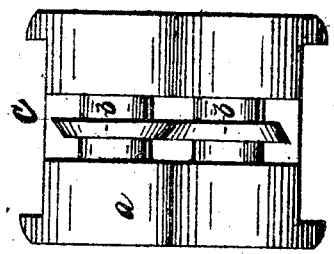
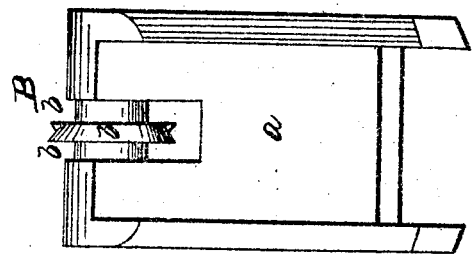
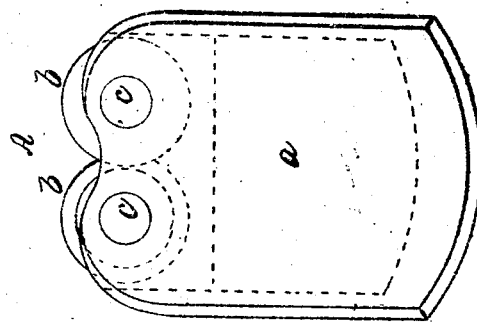
Inventor.
C. C. Parsons
Witnesses.
S. B. Kidder.
L. H. Latimer.

United States Patent Office.

C. C. PARSONS, OF BOSTON, MASSACHUSETTS.

*Letters Patent No. 69,473, dated October 1, 1867; antedated September 18, 1867.*

---

IMPROVED PIPE AND BOLT-CUTTER.

---

*The Schedule referred to in these Letters Patent and making part of the same.*

---

TO ALL WHOM IT MAY CONCERN:

Be it known that I, C. C. PARSONS, of Boston, in the county of Suffolk, and State of Massachusetts, have invented an Improved Pipe and Bolt-Cutter; and I do hereby declare that the following, taken in connection with the drawings which accompany and form part of this specification, is a description of my invention sufficient to enable those skilled in the art to practise it.

The invention relates to the construction of tools for cutting gas pipe, round bolts, or rods, &c.; and consists in employing in the cutter-stock two rotary disk-cutters working in conjunction, each of which has an angular cutting edge, the inclination of the two being opposite, and the cutting edge being upon the outer side or face of each.

A, in the drawing, represents the invention embodied in a stock to be applied to a slide-rest in a lathe. B is a side view, and C an end view of the same.

$a$ denotes the stock; $b\ b$ the rotary disk-cutters, each being mounted and turning loosely on a pin, $c$, extending through the stock. The stock is to be applied to the slide-rest in the lathe and pressed up towards the pipe or bolt which rotates in the lathe, and so as to bring the cutters into contact with the surface thereof in the plane where the cut is to be made, the pipe or bolt being brought equally or centrally against both cutters. The cutting edges of the two cutters will then operate on the surface of the pipe or bolt at a distance apart equal to the distance between the planes of said cutting edges, and as they are fed in, and the pipe or bolt is rotated, they will cut out the metal and sever the pipe or bolt. It will be observed that their action is not to merely displace the metal, throwing it up upon the surface of the pipe as burrs, which burrs have subsequently to be reduced by cutting or filing them down, but that they cut away the metal entirely, any burrs thrown up being carried into the cut-away portion, leaving the ends of the pipe smooth and of their normal diameter.

When the pipe is held stationary the cutters may be applied to a slide moving in a block having a recess for receiving the pipe to be cut, the block being fed by a screw-handle up against the pipe, which rests on one side of the recess, while the block is swung round the pipe by the handle in much the same way as the rotary-wheel pipe-cutter now in use is constructed and used.

In the use of the common rotary-disk pipe-cutter, having a $\wedge$-shaped cutting periphery, much difficulty is experienced on account of the necessity of reducing the burrs turned up by the cutter, and from the fact that the cutting edge soon becomes dulled. These difficulties, however, are wholly surmounted by my construction, which makes a clean, smooth cut, without leaving burrs, the material being chipped away by the action of the cutters, and the cutters keeping in good condition for a great length of time. The cutting edge of each disk is preferably on an angle of about forty-five degrees, but this may be somewhat varied.

I claim a pipe or bolt-cutter having two rotary disk-cutters, arranged to operate substantially as set forth.

C. C. PARSONS.

Witnesses:
F. GOULD,
L. H. LATIMER.